June 30, 1964 S. EGE 3,138,915
METHOD OF FORMING A SECTOR-CONDUCTOR CABLE
Filed Oct. 19, 1962 2 Sheets-Sheet 2

INVENTOR.
SIGMUND EGE
BY
V. F. Volk
HIS AGENT

United States Patent Office 3,138,915
Patented June 30, 1964

3,138,915
METHOD OF FORMING A SECTOR-CONDUCTOR CABLE
Sigmund Ege, Hastings on Hudson, N.Y., assignor, by mesne assignments, to Anaconda Wire and Cable Company, a corporation of Delaware
Filed Oct. 19, 1962, Ser. No. 231,700
1 Claim. (Cl. 57—160)

My invention relates to electric cables having sector conductors and particularly to a method of making such cables having tape insulation.

It is known in the high-voltage cable art to shape the three conductors of a cable intended for 3-phase service in the form of sectors of a circle. This has the advantage of producing a smaller cable core when the three conductors are twisted (cabled) together after they have been individually insulated. In manufacturing each of the conductors a plurality of round wires are first stranded in a circular cross section and then passed through compacting rolls which crush the wires out of their circular shape and at the same time deform the conductor into a section that, except for having rounded edges, approximates a sector of a circle. In making up a cable using these sectors as conductors, two different procedures have been known. These procedures can be better understood if a short explanation is first given of a fundamental difference that necessarily exists between cabling sector conductors and cabling ordinary round conductors.

When round conductors, which have been insulated, are stranded together to form a cable, they are paid from a "planetary" cable support. This type of support prevents any twist from forming in the individual conductors during the cabling operation by maintaining the pay-off reels on horizontal axes while they rotate around each other. The result is that, for each conductor, if a straight line marked longitudinally on the surface of the insulation appears uppermost on that conductor at one point of the cable, it remains uppermost throughout the length of the cable, although the conductor itself varies in position with respect to the other conductors in the cable. When sector conductors are cabled, however, the apex of the sector must always point toward the center of the cable.

To return, then, to the two known methods of forming sector-conductor cables: In the first method the sectors are compacted during the stranding operation by compacting rolls held stationary with respect to the strander, and are taken up on individual reels. Each conductor is then passed through a taping machine where a large number of insulating tapes are applied, one over the other, to form a thick layer of insulation. No twisting takes place during this operation and the insulated conductors leaving the taping machine are again taken up on reels. Three of the reels are then placed on a "rigid" cabling machine in such a manner that a twist is imparted to each conductor around its own axis for each turn the conductors take around each other; and the machine is rotated to form a cable. An objection to this method of forming sector cables is that, in addition to twisting the conductors, the operation also twists the insulation, which commonly comprises paper tapes having a limited stretch and considerable stiffness. If this twisting is severe enough it may tear or crease the paper insulation, and in any case is causes some distortion and loosening of the insulating tapes. Particularly in the case of extra high-voltage cables, where the insulation will be subjected to high electrical stresses, it is important to avoid any creasing or irregularity in the insulation layer.

In the other known method of forming sector cables the compacting rolls are not held stationary but rotate around the conductor during the stranding operation so that the conductor is compacted in a long helix having the same length of twist as the lay of the cable to be formed from it. This conductor is also taken up on reels, insulated with wrapped tapes, and taken up on reels again, which are placed in a cabling machine. But in this case the reels are put in a planetary machine and no twist is applied to the insulation during the cabling operation. The defect in this method is associated with that stage of the operation during the reeling of the compacted strand prior to insulating. When the conductor is wound onto the reel, whichever surface of the triangular section of the conductor faces the surface of the drum tends to remain against that surface and twist the conductor rather than raise the conductor over one of the edges of the cross-section. Under these circumstances it is difficult or impossible to keep the length of lay uniform, with the result that when the conductor is finally cabled, the twist in the individual conductors will not correspond to the lay of the cable, and the apex of the conductor section will not always be directed toward the center of the cable. In addition, as the twisted conductor is taken up on the reel, because of the helical formation of the sector shape, it cannot be laid in even convolutions on the reel but will have layers where an edge of an overlying conductor crosses an edge of an underlying conductor, with the result that the sections are nicked or deformed. This condition is aggravated by the fact that the conductors are usually in a soft, annealed state.

I have invented a method that overcomes the defects of both of the aforementioned methods of making sector cables. In my method the compacting rolls are held stationary and the conductors are taken up on reels without having any helical twist that might be deformed. At the taping machine, however, I place the reels in a cradle and twist the conductor to the desired lay while it is being taped. The insulated conductors are then cabled in a planetary cabler so that the insulating tapes are not distorted.

I utilize apparatus for forming a sector conductor comprising means paying off the conductor into a tape-applying means where the paying-off means rotates so as to apply an individual twist to the conductor, means continuously applying a plurality of layers of insulating tape over the conductor being twisted to form an insulated conductor, and means taking up the insulated conductor without untwisting it. My apparatus advantageously also comprises clamping means such as pinch rolls adjacent the paying off means, clamping the conductor and rotating at the same speed as the paying-off means.

I have invented the method of forming a sector-conductor cable comprising the steps of twisting together a plurality of strands to form a round conductor, compacting the round conductor into a sector, taking it up on a reel without twisting, and paying the conductor into a taping means while twisting it with a selected length and direction of lay. In my method I then apply a plurality of layers of insulating tape over the conductor in the taping means, thereby forming an insulated conductor. This is followed by the steps of taking up the conductor on a cable reel with the conductor twisted around its own axis on the reel, mounting a plurality of these insulated conductors in a planetary cabling machine, and cabling the insulated conductors with a length and direction of lay equal to the selected length and direction of lay without further twisting the conductors.

A more thorough understanding of my invention may be gained from a consideration of the appended drawing.

Figure 1:
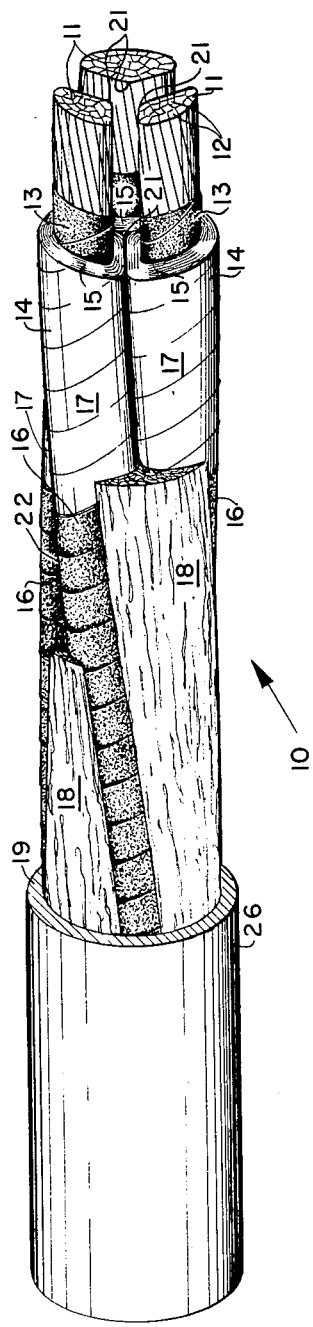
FIGURE 1 is a perspective view of a cable made by the method of my invention.
Figure 2:
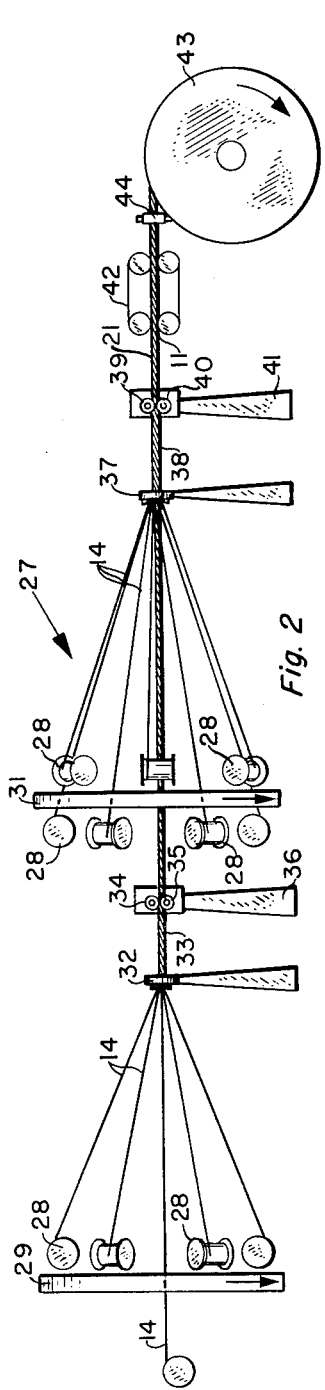
FIGURE 2 is a side view of a strander used in the method of my invention.
Figure 3:
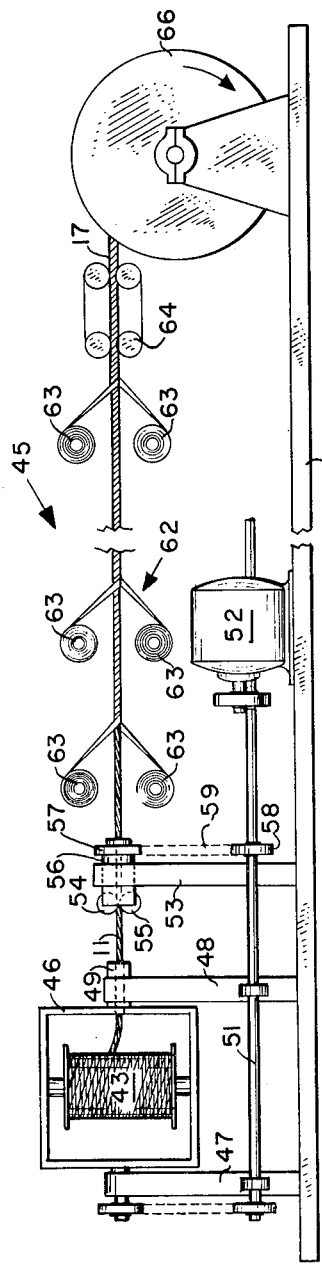
FIGURE 3 is a side view of apparatus of my invention.
Figure 4:
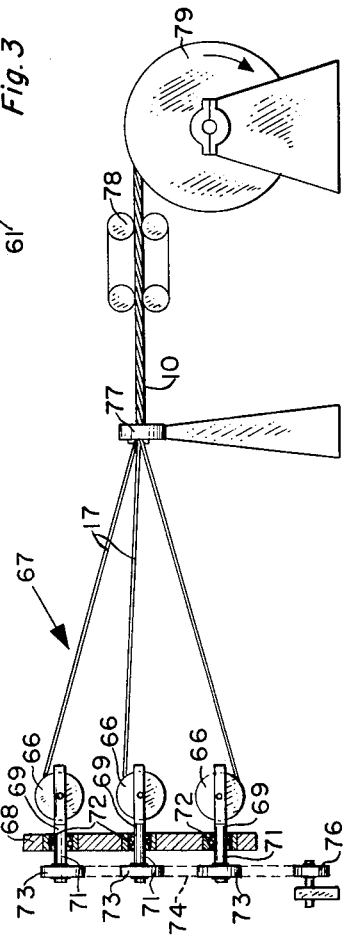
FIGURE 4 is a side view of a cabler used in the method of my invention.

In order properly to understand the purpose of the apparatus and method shown in FIGURES 2-4 it is necessary to consider the structure of a cable 10 shown in FIGURE 1. The cable 10 has three compact segmental conductors 11 in which conducting wires 12, which were originally circular in section, have been compacted to irregular shapes so that the conductors 11 have the general shape of sectors of a circle. The wires 12 have been stranded together with a left-hand lay for each of the three conductors. Strand shielding tapes 13 and insulating tapes 14 have been wrapped around the conductors 11 with a right-hand lay, the tapes 14 forming a plurality of layers 15 of insulation around the conductors. The layers 15 are, in turn, covered with shielding tapes 16 in a known manner. The combination of conductors 11 with their surrounding tapes 13, 14, 16 constitutes insulated conductors 17 which have been cabled together with a long left-hand lay along with filler strands 18 and covered by a lead sheath 19. The sector conductors 11 have cross-sectional apexes 21 facing inwardly of the cable throughout its length and this requires that each of the conductors 11 should be twisted on its own axis with the same length of lay as is found in the cable 10 formed from the insulated conductors 17. The twist in the conductors 11 can be visualized by reference to an edge 22 of one of the insulated conductors 17 which is seen to be spiralled with a left-hand twist.

To make the cable 10 I employ the novel apparatus and method of FIGURES 2-4. Here a stranding machine, indicated generally by the numeral 27 (FIGURE 2), is forming a conductor such as the conductor 11. The wires 12 forming the conductor 11 are paid from reels 28 which have been rigidly mounted on frames 29, 31 rotating in planes normal to the plane of the figure. The frames 29, 31 rotate clockwise as viewed from upstream and thus apply a left-hand lay to the strands. The wires paying from the reels on the frame 29 pass through a forming die 32 and emerge as a circular core 33 over which are wound the wires mounted on the frame 31. Prior to passing through the frame 31, however, the core 33 is compressed into a sector shape by compacting rolls 34, 35 mounted on a fixed pier 36 so as to compact the core into a sector shape with its apex uppermost. Leaving the frame 31 the strands pass through a forming die 37 from which they emerge as a conductor 38. The conductor 38 passes through compacting rolls 39, 40 of known type, similar to the rolls 34, 35, which compact them into the sector shape characterizing the conductor 11. The rolls 39, 40 are mounted on a fixed pier 41 and the strand is so compacted that its apex 21 forms uppermost.

The conductor 11 is drawn through the strander 27 by a caterpillar capstan 42 and is taken up on a reel 43 driven by known means not shown. The conductor 11 is guided onto the reel 43 by traverse guide rolls 44 and, because the apex 21 faces radially outwardly on the reel 43, the conductor 11 can be formed into evenly spaced layers on the reel, free from cross-overs except at the reels flanges. The reel 43 may be stored after leaving the strander along with similar reels until it can be scheduled for insulating on a paper-taping machine 45 (FIGURE 3). For feeding into the machine 45 the reel 43 is mounted in a cradle 46 mounted on uprights 47, 48. The cradle 46 has a hollow forward shaft 49 through which the conductor 11 passes while being twisted. The cradle 46 is driven by means of a taping machine shaft 51 driven, in turn, by a motor 52. Mounted downstream of the upright 48 is a pier 53 supporting pinch rolls 54, 55 mounted on a shaft 56 journalled so as to be rotated at the same speed and direction as the cradle 46 from the shaft 51 by means of sprockets 57, 58 and a chain 59. The rotating pinch rolls 54, 55 constitute a clamp that assures an even lay of twist of the conductor 11.

Mounted on a common base 61 with the uprights 47, 48, 53 is a taping head apparatus 62 of known construction of which the structural supports are not shown. By means of the apparatus 62 paper-tape coils 63 are rotated around the conductor 11 so as to build up the layers of insulation 15 (FIGURE 1) and form the insulated conductor 17. The insulated conductor 17 is urged through the machine 45 including the apparatus 62 by a capstan 64 and is taken up on a reel 66 driven by means not shown.

For combining the insulated conductors 17 into a cable, three of the reels 66 are mounted in a cabler 67 (FIGURE 4) on a rotating frame 68 in such a manner that they have a planetary motion. This motion is such that the reels 66 remain horizontal at all times while the frame 68 is rotating, and is achieved by mounting the reels in cradles 69 which have shafts 71 passing through bushings 72 in the frame 68. Sprockets 73, all the same size, are keyed to the shafts 71 and are connected by means of a chain 74 to an equal-sized fixed sprocket 76 so that the sprockets 73 do not rotate on their own axes during the rotation of the frame 68.

Various types of planetary cablers are known and selection of a particular type does not constitute a novel feature of my invention. The insulated conductors 17 are urged through a forming die 77 to form the cable 10 by a capstan 78 and taken up on a reel 79 driven by means not shown. Subsequently the lead sheath 19 may be applied in a known manner.

It is important to the successful operation of my method that the length of lay of the insulated conductors 17 in the cable 10 imparted by the cabler 67 should be the same as the length of the twist in the conductors 11 imparted by the rotation of the cradle 46. Methods of controlling the length of lay of the cable 10 are known to depend on the speed of the capstan 78 relative to the rotation of the frame 68, and means of adjusting the lay are known to persons in the cable art.

I have invented a new and useful method for which I desire an award of Letters Patent.

I claim:

The method of forming a sector-conductor cable comprising the steps of:

(A) twisting together a plurality of strands to form a conductor, (B) compacting said conductor into a sector, (C) taking up said conductor on a reel without twisting said conductor, (D) paying said sector-shaped conductor into a taping means while twisting said conductor with a selected length of lay and direction of lay, (E) applying a plurality of layers of insulating tape over said conductor in said taping means and thereby forming an insulated conductor, (F) taking up said insulated conductor on a cable reel, said conductor remaining twisted around its own axis while on said reel, (G) mounting a plurality of said insulated conductors in a planetary cabling machine, and (H) cabling said insulated conductors with a length of lay and direction of lay equal to said selected length of lay and direction of lay without further twisting said insulated conductors.

References Cited in the file of this patent

UNITED STATES PATENTS

| | | |
|---|---|---|
| 1,874,413 | Angell | Aug. 30, 1932 |
| 2,006,333 | Angell et al. | July 2, 1935 |
| 2,098,922 | McKnight | Nov. 9, 1937 |
| 2,169,828 | Wolf | Aug. 15, 1939 |
| 2,189,314 | Johnson | Feb. 6, 1940 |

FOREIGN PATENTS

| | | |
|---|---|---|
| 25,167 | Australia | of 1935 |
| 366,823 | Great Britain | Feb. 11, 1932 |